Oct. 25, 1960
P. A. HARDING
2,958,043
MEASUREMENT AND ELIMINATION OF FLUTTER
ASSOCIATED WITH PERIODIC PULSES
Filed Dec. 15, 1959
6 Sheets-Sheet 2
FIG. 3
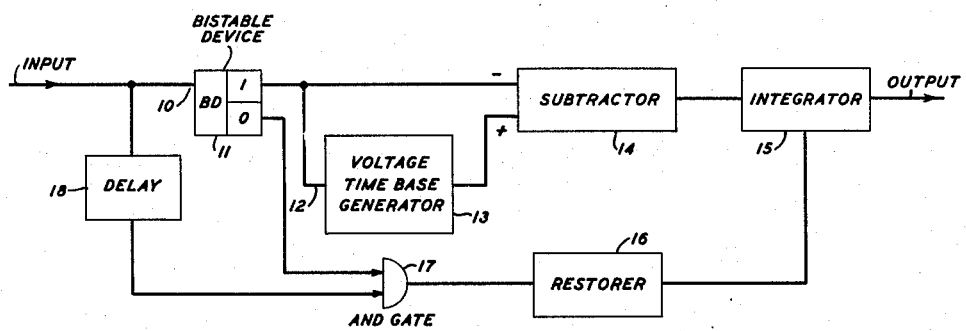
FIG. 4
"1" OUTPUT OF BISTABLE DEVICE
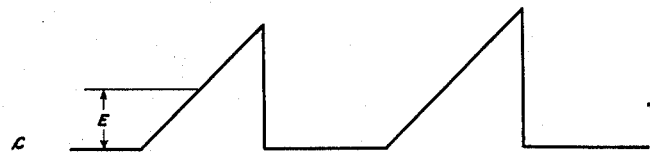
VOLTAGE TIME BASE GENERATOR OUTPUT
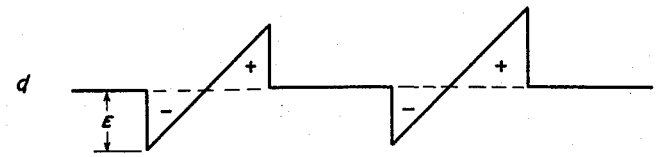
SUBTRACTOR OUTPUT
INVENTOR
P. A. HARDING
BY
R. B. Ardis
ATTORNEY

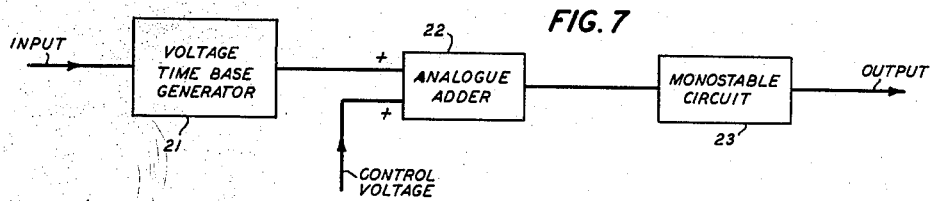
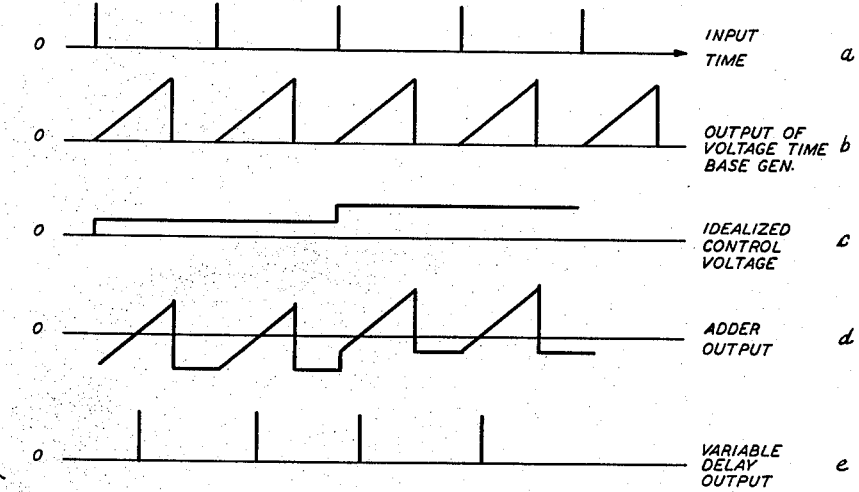
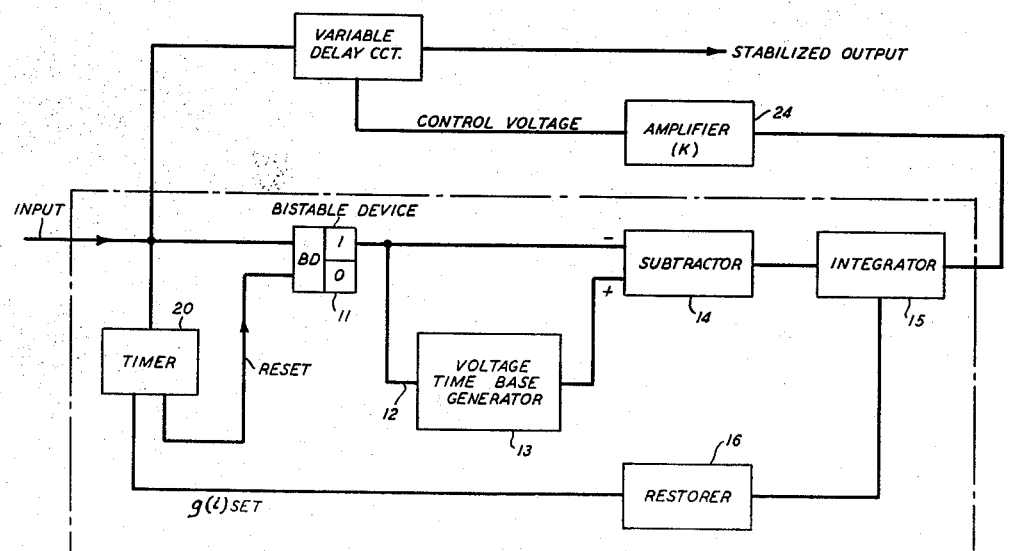

United States Patent Office 2,958,043
Patented Oct. 25, 1960

2,958,043

MEASUREMENT AND ELIMINATION OF FLUTTER ASSOCIATED WITH PERIODIC PULSES

Philip A. Harding, Fort Lee, N.J., assignor to Bell Telephone Laboratories, Incorporated, New York, N.Y., a corporation of New York Filed Dec. 15, 1959, Ser. No. 859,660

7 Claims. (Cl. 328—140)

This invention relates to signal transmission systems employing a train of clock pulses and more particularly to pulse systems wherein there is a source of clock pulses used to effect the synchronization of operations.

In many digital data processing systems information in binary form is stored on magnetic tapes and magnetic drums. These forms of storage customarily have a plurality of information tracks upon which there is stored, usually in binary form, information, such as, for example, data pertaining to the inventory of a particular company. Reading heads in the digital data processing apparatus are adapted to read from these storage records the binary information contained thereon.

In order for the stored information to be read it is necessary either to physically move the record having the information stored thereon relative to the reading head or to move the reading head relative to the storage means. Whichever method is used it is necessary that the operation of the driving means by synchronized with the rest of the system. If the system is not synchronized its sequential operation will be destroyed. For example, in the absence of synchronization, an "adding" circuit may receive a signal to "add" before all the information is read from the storage device, or a "printing" circuit may receive a signal to "print" before all the information is read from the record.

Because of the above problem it has become customary in the art to add a clock pulse "track" to the information storage record. To the clock "track" is applied a train of continuously recurring periodic pulses called clock pulses which are used as a source of timing pulses for all the operations of the system. In many data processing systems it is necessary that the time separation between the clock pulses be constant. If the time separation between the pulses of a clock train is not constant then the pulse train is said to have a flutter or jitter content. In contrast with some signal transmission systems where flutter is a controllable parameter dependent, for example, upon the stability of an oscillator, the flutter of a clock train derived from a magnetic tape recorder is usually not a controllable parameter but is dependent upon the recording tape, the recording mechanism and the manner in which the mechanism is operated. When, for example, a computer is intermittently started and stopped the inherent acceleration and deceleration of the tape causes flutter in the train of clock pulses which is not a controllable parameter. Also, in signal transmission systems using clock pulses to synchronize various elements of the system, it is essential that the clock pulse train be free of flutter.

A principal object of the present invention is to measure the flutter content of clock pulse trains in signal transmission systems.

A related object of the present invention is to reduce the flutter content of clock pulse trains in signal transmission systems.

A further object of the present invention is to facilitate the controllable delay of periodic pulses having a flutter content.

This invention comprises circuitry for the generation of voltages whose amplitudes and polarities are determined by the flutter of a train of clock pulses. A constant amplitude pulse whose width is equal to the time between pulses is subtracted from a sawtooth wave of the same width whose maximum amplitude is twice that of the constant amplitude pulse if there is no flutter present. If flutter is present integration of the difference yields a control voltage whose amplitude and polarity is determined by the flutter.

The control voltage may be used to reduce the flutter by adding it to a constant slope output voltage which is initiated from a reference level by the input pulses. When the sum of the control voltage and the constant slope output voltage exceeds a predetermined threshold level an output pulse is generated. Varying the control voltage alters the time at which the sum of the voltages reaches the threshold level to trigger an output pulse, and the control voltage is varied to compensate for any flutter in the incoming pulse train.

The invention will be more fully understood from the following detailed description of preferred embodiments thereof taken in conjunction with the appended drawings, in which:

Fig. 3 is a block diagram of a flutter measuring set embodying the invention;

Fig. 4 is a group of waveforms useful in explaining the operation of the flutter measuring set;

Fig. 7 is a block diagram of a variable delay circuit to facilitate the controllable delay of periodic pulses in accordance with the invention;

Fig. 8 is a group of waveforms useful in explaining the operation of the variable delay circuit;

Fig. 9 is a block diagram of a flutter reduction system embodying the invention;

An ideal continuously recurring train of clock pulses with a repetition rate of $1/T_0$ can be described by the equation $$T_i = (i-1)T_0$$

in which $T_i$ is the time of the $(i)$th pulse with the first pulse occurring at zero time. In the case of the ideal clock pulse train the time between pulses is constant at $T_0$; if the time between pulses varies from $T_0$ then the pulse train is said to have a flutter or jitter content. Where flutter is present the time between the $(i-1)$th and the $(i)$th pulse is $T_0 + \Delta T_i$ where $\Delta T_i$ represents the deviation from the time $T_0$.

Figure 1:
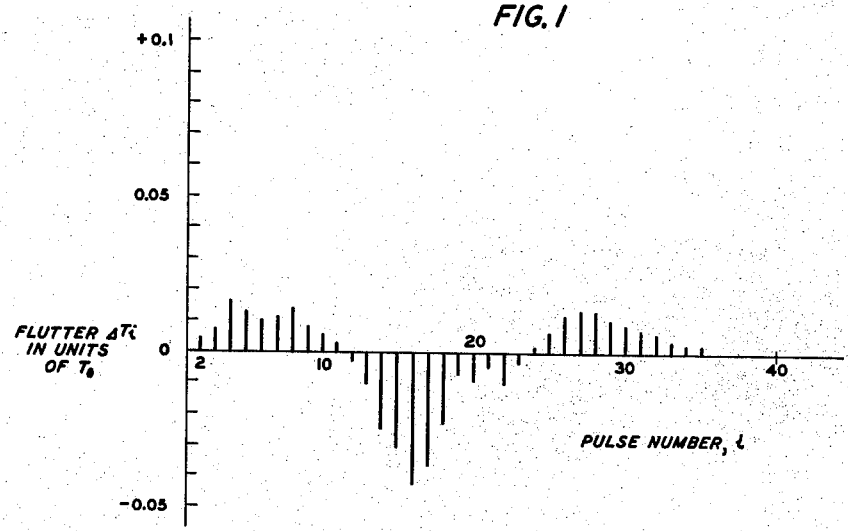
Fig. 1 is a plot where the abscissa represents the number of pulses from the start of a pulse train and the ordinate represents the flutter.
Figure 2:
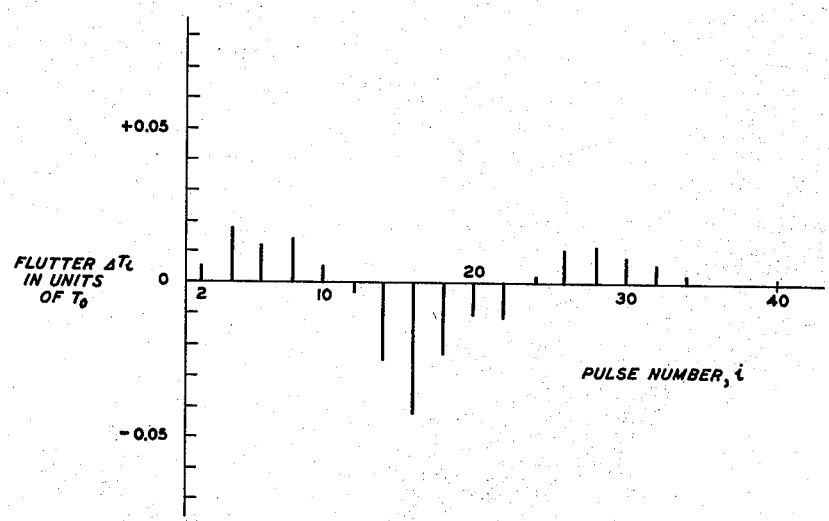
Fig. 2 is a plot where the abscissa represents the number of even pulses from the start of a pulse train and the ordinate represents the flutter.

The first of three parameters associated with flutter is the deviation, $\Delta T_i$, of the time between each pair of pulses from $T_0$. A plot of typical values of $\Delta T_i$ is shown in Fig. 1 where the abscissa represents the number of pulses from the start of the pulse train and the ordinate represents the jitter $\Delta T_i$ in units of $T_0$. By measuring the time between odd pulses and their succeeding even pulses and assuming that succeeding odd pulses have the same jitter as their immediately preceding even pulses relatively simple circuits may be used to measure jitter. If only the increments between odd pulses and their succeeding even pulses are sampled the plot of typical values of $\Delta T_1$ in Fig. 1 reduces to that shown in Fig. 2.

Because of the importance of the parameter $\Delta T_i$, it is desirable to provide instrumentation for its measurement. Fig. 3 illustrates a jitter measuring set which generates pulses whose amplitudes and polarities are proportional to $\Delta T_i$, and which may be used to produce an oscilloscope display similar to the representation of Fig. 2. The pulse train of clock pulses is applied to the input 10 of a single input bistable device 11 having two output terminals. A bistable device has two stable conditions, and is said to be "set" when a reference voltage appears at a first of its output terminals, designated the "1" output, and is said to be "reset" when a reference voltage appears at the second of its two output terminals, designated the "0" output terminal. When the bistable device is "set" a ground voltage appears at the "0" output terminal, and when the bistable device is "reset" a ground voltage appears at the "1" output terminal. Incoming input pulses set and reset the bistable device, the first input pulse setting the bistable device, the second resetting the bistable device, the third setting the bistable device, and so on. The "1" output terminal of bistable device 11 is connected to the input 12 of a voltage time base generator 13 which is actuated when the bistable device is "set." The "1" output of the bistable device 11 and the output voltage of the time base generator 13 are shown in lines (b) and (c) respectively of Fig. 4 in relation to the odd and even clock pulses of the clock pulse train shown in line (a) of Fig. 4. Since the voltage time base generator is actuated when the bistable device 11 is set, produces a voltage linearly increasing with time, and is deactuated when the bistable device 11 is reset, the output peak amplitude of the voltage time base generator 13 is proportional to $T_0 + \Delta T_i$.

The outputs of the voltage time base generator 13 and the "1" output of the bistable device 11 are fed into an analog subtractor 14. The amplitude of the bistable device "1" output voltage and the slope output of the voltage time base generator are adjusted so that the output voltage of the time base generator is twice the "1" output voltage of the bistable device at time $T_0$. The subtractor output voltage is shown in line (d) of Fig. 4. The difference in the areas of the positive and negative triangles is proportional to $\Delta T_i$, if $\Delta T_i$ is much less than $T_0$. Therefore, integrating the output of subtractor 14 by means of integrator 15 produces a voltage at the output of integrator 15 which is proportional to the jitter between an odd pulse and its succeeding even pulse.

During the interval between an even pulse and its succeeding odd pulse it is desired that the integrator be restored. Delay circuit 18 delays the input pulses, and the simultaneous occurrence of a reference voltage at the "0" output of the bistable device and a delayed even pulse actuates AND gate 17 to cause restorer 16, which may be a simple diode clamping circuit, to restore integrator 15. The delay introduced by the delay circuit 18 is approximately .1($T_0$). The jitter measuring set shown in Fig. 4 does not measure the jitter between an even pulse and its succeeding odd pulse but assumes that jitter to be equal to the jitter between the even pulse and its preceding odd pulse.

The second important parameter associated with flutter is the accumulated flutter. In a pulse train of continuously recurring pulses having a flutter content the (i)th pulse occurs at the time $$T_i = (i-1)T_0 + \sum_{m=1}^{i} \Delta T_m \quad (1)$$

where the first term at the right hand side of the equation represents the time of the (i)th pulse of a flutter free train and the second term on the right hand side of the equation is the accumulated flutter of an actual pulse train. Thus the accumulated flutter is simply $$\text{Accumulated flutter} = \sum_{m=1}^{i} \Delta T_m = g(i) \quad (2)$$

Since the flutter measuring set shown in Fig. 3 measures only the flutter between odd pulses and their succeeding even pulses and assumes that suceeding odd pulses have the same flutter as preceding even pulses, then in such a system $$\text{Accumulated flutter} \cong 2\sum_{m=1}^{\frac{i}{2}} \Delta T_{2m} = g(i)'$$

The maximum and minimum values of accumulated flutter over all $i$ are defined as $g(i)'$ max. and $g(i)'$ min.

Figure 5:
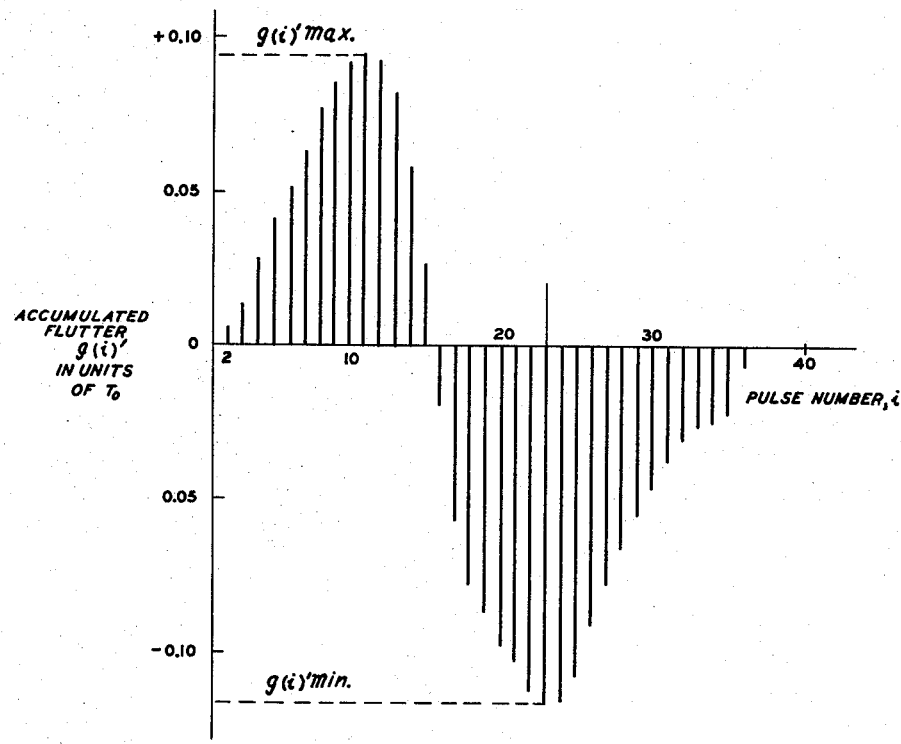
Fig. 5 is a plot where the abscissa represents the number of pulses from the start of the pulse train and the ordinate represents the accumulated flutter.

Fig. 5 shows a typical plot of $g(i)'$, including the parameters $g(i)'$ max. and $g(i)'$ min. as a function of $i$. This curve can be obtained from Fig. 1 by summing all the sampled elements.

Figure 6:
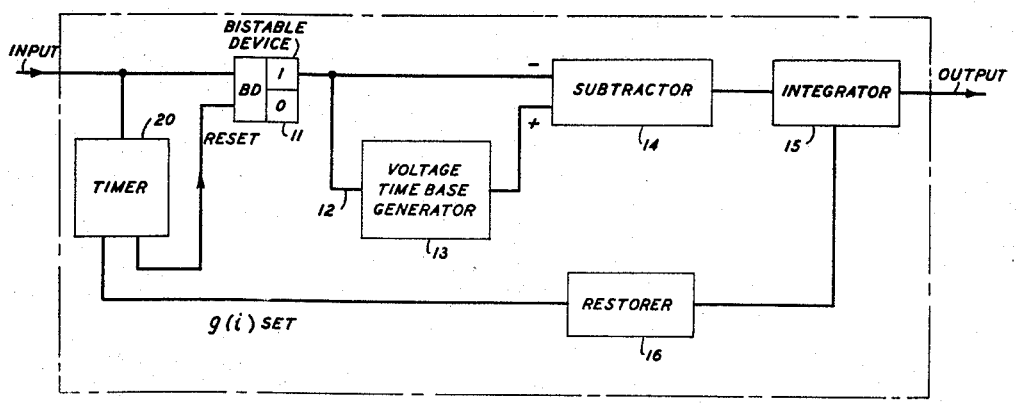
Fig. 6 is a block diagram of an accumulated flutter measuring set embodying the invention.

Fig. 6 illustrates apparatus which has the ability to generate a voltage whose amplitude is proportional to $g(i)$. The apparatus shown in Fig. 6 is identical to the apparatus shown in Fig. 3, with the exception of the fact that the integrator is now restored by the action of a timer 20 whose output is connected to the input of integrator 15 by means of restorer 16. The timer, which may be of the type described in copending application Serial No. 754,872, filed August 13, 1958, by J. A. O'Brien and assigned to the present assignee, produces an output when clock pulses cease to appear at the input 10, and triggers restoring circuit 16 to reset integrator 15. The output of the timer 20 also "resets" bistable device 11 to prepare it for the next train of pulses. The similarity between the circuits shown in Figs. 3 and 6 results from the fact that $g(i)$ is the sum of all $\Delta T_i$ for even values of $i$. Since the jitter measuring set generates voltages proportional to the even values of $\Delta T_i$, $g(i)$ can be utilized by summing the output of the jitter set. By restoring the integrator 15 after a group of pulses has passed through, $g(i)$ is realized for that train of pulses.

Flutter can be reduced or eliminated in accordance with the invention by inserting the input pulse train into a variable delay circuit whose delay is a function of a control voltage which, in turn, is a measure of a flutter. If the delay of the variable delay circuit is decreased proportionately as the accumulated flutter increases the long time constant flutter will be reduced. The time of the (i)th pulse of an unstabilized train is $$T_i = (i-1)T_0 + \sum_{m=1}^{i} \Delta T_m$$

The time between consecutive even pulses is $T_i$ minus $T_{i-2}$. This time is $$T_i - T_{i-2} = 2T_0 + \Delta T_i + \Delta T_{i-1}$$

The flutter factor, $\alpha_i$, is defined as $$\alpha_i = \frac{(T_i)-(T_{i-2})-2(T_0)}{2T_0} = \frac{(\Delta T_i)+(\Delta T_{i-1})}{2T_0}$$

If $\Delta T_i$ is approximately equal to $\Delta T_i - 1$ then $\alpha_i$ is approximately equal to $$\frac{\Delta T_i}{T_0}$$

When the pulse train is inserted into a variable delay circuit the output time of the $T_1$th pulse $$T'_i = (i-1)T_0 + \sum_{m=1}^{i} \Delta T_m + \varphi$$

where $\varphi$ is the delay as a function of a control voltage. To eliminate the flutter, $\varphi$ is composed of $\varphi_0 - Kg(i)$, where $\varphi_0$ is a fixed delay, $K$ is a positive constant and $g(i)$ is as defined in Equation 2 and is generated by the incoming clock train. The flutter factor of the delay pulse is $$\alpha_i' = \frac{(T'_i) - (T'_{i-2}) - (2T_0)}{2T_0}$$

$$= \frac{(\Delta T_i) + (\Delta T_{i-1}) + Kg(i-2) - Kg(i)}{2T_0}$$

which reduces to $$\alpha_1' = \frac{\Delta T_i(1-K) + T_{i-1}}{2T_0}$$

where $\alpha_1'$ is a random variable. Considering only a special case in which $\Delta T_i$ is approximately equal to $\Delta T_{i-1}$ $$\alpha_1' \cong \frac{2-K}{2}\alpha_i$$

Thus, in this special case the flutter of the stabilized train is reduced by a factor $$\frac{2-K}{2}$$

and if $K$ is 2 the flutter will will be zero. Since $K$ is a proportionality constant it may be equal to the gain of an amplifier or the setting of a potentiometer. Due to the fact that there is an upper limit on the value of $K$ the flutter cannot always be completely eliminated even if $g(i)$ can be realized. This results from the fact that negative delay is not physically realizable and $\varphi$ therefore must be either positive or zero. Thus, in order to reduce flutter a variable delay circuit is necessary in which the delay is a function of a control voltage which is, in turn, a measure of a flutter. Thus, the delay of the variable delay circuit is decreased as the accumulated flutter increases, and the delay is increased as the accumulated flutter decreases.

Fig. 7 is a block diagram of a variable delay circuit which meets the above-described requirements. The input train of pulses is fed into a voltage time base generator 21. Each pulse triggers the time base generator 21 so that it begins to generate a constant slope output voltage from a zero reference level. The output of the voltage time base generator 21 is applied to one input of an analog adder 22 to whose second input there is applied a control voltage which varies in accordance with the accumulated flutter in the input train of pulses. The pulse train input, the output of the voltage time base generator, and an idealized representative control voltage are shown with relation to time in lines (a), (b) and (c) respectively of Fig. 8. The adder output in response to the input of the control voltage and the output of the time base generator is shown in line (d) of Fig. 8. The adder output is applied to a monostable circuit 23, such as a monostable multivibrator or blocking oscillator, which is fired to generate a pulse, shown in line (e) of Fig. 8, when the output of the adder reaches a predetermined threshold level. Varying the control voltage varies the time at which the adder output arrives at the threshold triggering level with increasing control voltage decreasing the delay and decreasing control voltage increasing the delay.

The variable delay circuit requires a constant control voltage during the time interval in which a pulse is passing through the delay circuit. The control voltage as shown in line (c) of Fig. 8 has been shown to be constant during this interval in order to illustrate the operation of the variable delay circuit. If the control voltage is not constant during this interval the delay is not a linear function of the voltage, and all changes in the control voltage must therefore occur when no pulse is passing through the variable delay circuit.

Fig. 9 shows a flutter reduction system embodying the invention in which the $g(i)$ measuring set of Fig. 6 is combined with the variable delay circuit of Fig. 7. The output of integrator 15 is connected to the variable delay circuit by means of an amplifier 24 which introduces the above-described parameter $K$, since the gain of the amplifier is proportional to $K$. Because of the fact that the variable delay circuit requires a constant control voltage during the time interval in which a pulse is passing through the delay circuit the flutter reduction system shown in Fig. 9 stabilizes only even pulses since the control voltage is changing during the interval between each odd pulse and its succeeding even pulse. This change in the value of $g(i)$ results from the fact that during the time interval between an odd pulse and its succeeding even pulse the integrator output contains two signal components. The first signal component is the value of $g(i)$ which exists prior to the currents of the odd pulse, and the second signal component is due to the integration of the positive and negative triangles appearing at the integrator input during the interval between the odd pulse and its succeeding even pulses. The flutter reduction system shown in Fig. 9 therefore stabilizes only even pulses and if the integrator output changes significantly during the interval between an odd pulse and its succeeding even pulse the variation in the delay of the odd pulses may overshadow the stabilization of the even pulses.

Figure 10:
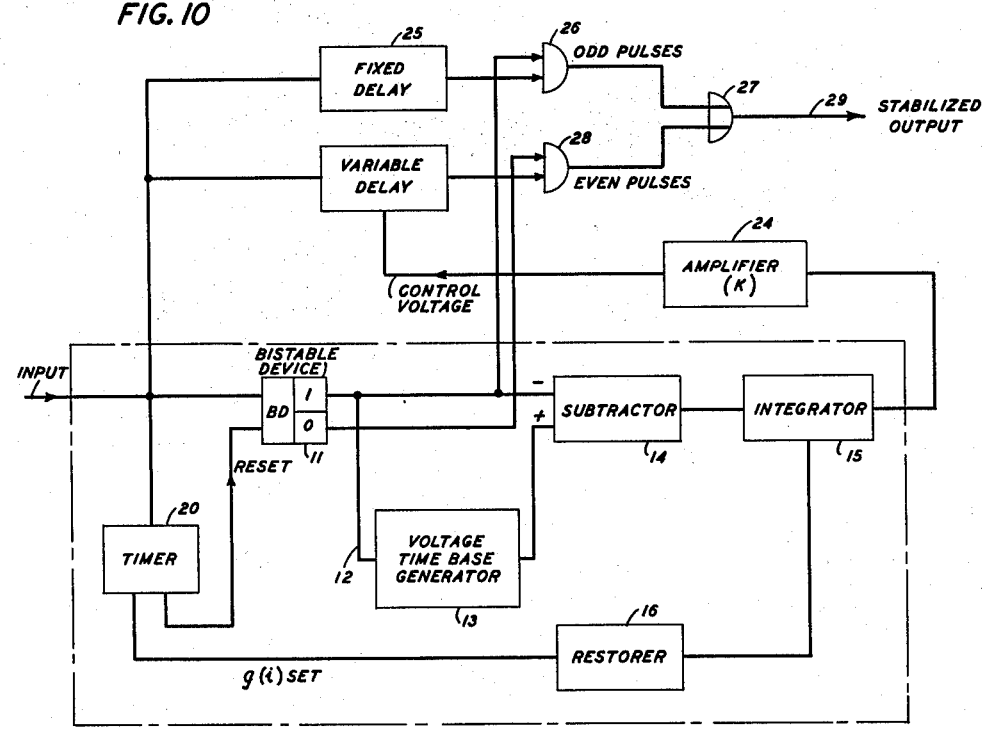
Fig. 10 is a block diagram of an even pulse flutter reduction system embodying the invention.

In particular applications it may be satisfactory to stabilize only every other pulse. This may be achieved by sending the even pulses through the variable delay circuit shown in Fig. 7 and the odd pulses through a fixed delay circuit. The flutter reduction system shown in Fig. 9 may be used to control even pulses only and a fixed delay circuit may be used to pass the odd pulses. An even pulse stabilization set is shown in Fig. 10. The input pulse train is applied to a fixed delay circuit 25, the variable delay circuit shown in Fig. 7, and the $g(i)$ measuring set shown in Fig. 6. The output of the $g(i)$ measuring set is applied to the variable delay circuit through amplifier 24, as in the flutter reduction system of Fig. 9, and is used to control the delay of the variable delay circuit. The output of fixed delay circuit 25 is applied to one input of a two-input AND gate 26, whose output is connected to an OR gate 27. The output of the variable delay circuit is applied to one input of a two-input AND gate 28 whose output is also applied to an OR gate 27. Odd pulses set bistable device 11 and the "1" output voltage is used to actuate AND gate 26 thus allowing the odd pulse to pass through fixed delay circuit 25 to the output terminal 29. Even pulses reset bistable device 11, actuating AND gate 28, and therefore pass through the variable delay circuit to the output terminal 29. The value of fixed delay introduced by fixed delay circuit 25 is adjusted so that it is approximately equal to the expected average flutter of the incoming pulse train.

Figure 11:
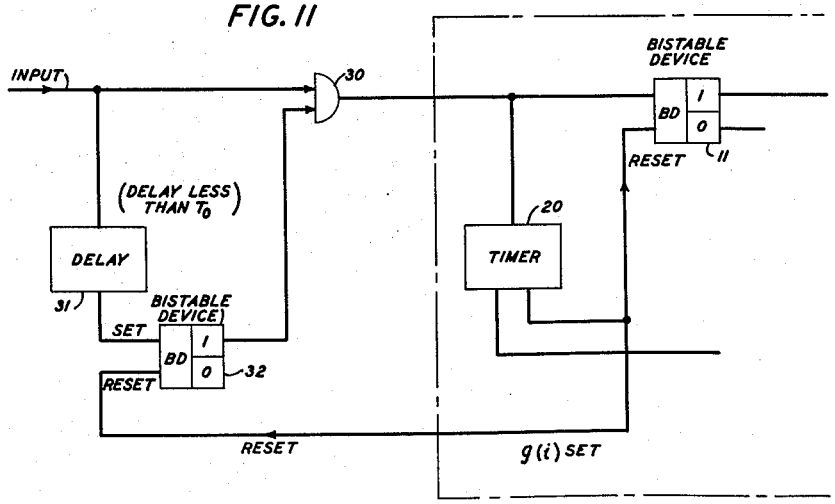
Fig. 11 is an input circuit for an odd pulse flutter reduction system.

In some applications it may be necessary to achieve complete stabilization. Two independent $g(i)$ sets; one to control the delay of even pulses and the second to control the delay of odd pulses can be used to so eliminate flutter. The even pulse $g(i)$ set is shown in Fig. 6. The odd pulse $g(i)$ measuring set is 180 degrees out of phase with the even pulse set so that its integrator output is actively changing during the interval between an even pulse and its succeeding odd pulse. Fig. 11 illustrates the input to the $g(i)$ set shown in Fig. 6 which inhibits the first pulse of the incoming pulse train so that a phase shift of 180 degrees is achieved. The incoming pulses are applied to an AND gate 30 and to a delay circuit 31. The delay introduced by delay circuit 31 is less than $T_0$ so that the output of the delay circuit sets bistable device 32 sometime after the first pulse has been applied to the input but before the second pulse has been applied to the input. The output of bistable device 32 actuates AND gate 30 so that all input pulses after the first pulse are applied to the $g(i)$ measuring set which is shown in Fig. 6. At the end of the burst of pulses the block timer 20 resets flip flop 32 as well as the circuitry in the $g(i)$ set so that the entire apparatus is prepared for a new train of pulses.

Figure 12:
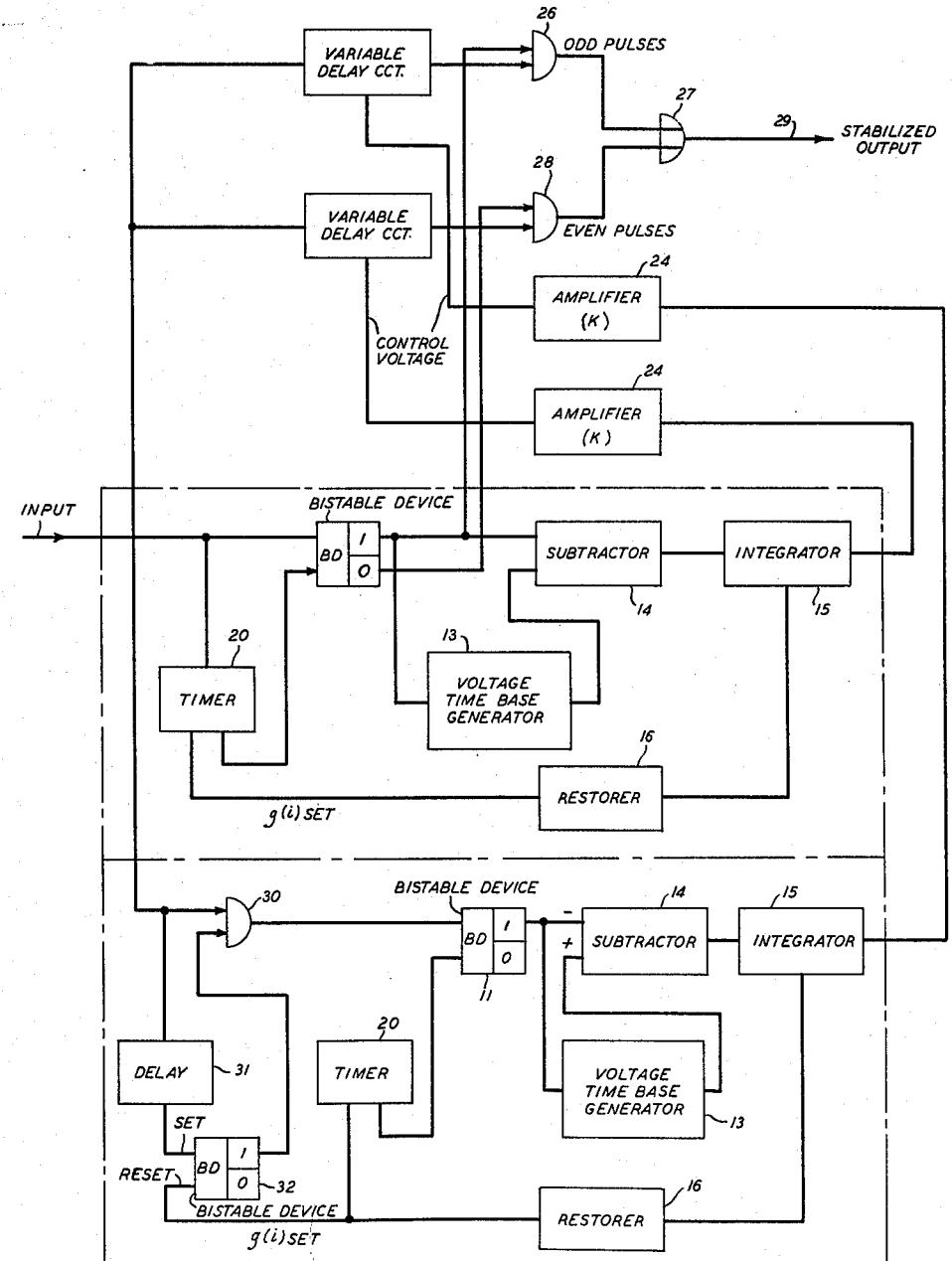
Fig. 12 is a block diagram of a flutter reduction system embodying the invention which stabilizes both odd and even numbered pulses.

The combination of the odd and even $g(i)$ sets to achieve complete stabilization is shown in Fig. 12. Fig. 12 differs from Fig. 10 in that fixed delay circuit 25 has been replaced by the variable delay circuit shown in Fig. 7, and the variable delay circuit is controlled by the output of a $g(i)$ set whose input circuit is the circuit shown in Fig. 11.

A simple circuit for achieving complete stabilization without the necessity of providing two independent $g(i)$ sets is achieved through recognition of the fact that the change in control voltage during the interval between an odd pulse and its succeeding even pulse in the circuit of Fig. 9 is due to the fact that the integrator output contains two signal components, one due to the actual value of $g(i)$ and the second due to the integration of the positive and negative voltage difference triangles appearing at the integrator input. The time durations of the triangles are approximately equal to $T_0/2$ and the triangle integration signal component therefore has a narrow frequency spectrum about $1/T_0$. To eliminate the change in control voltage during the time interval between an odd pulse and its succeeding even pulse it is only necessary to add a band elimination filter in the amplifier circuit 20 at the output of the integrator. The filter passes all frequencies except for a narrow band about $1/T_0$. The block diagram of such a scheme is shown in Fig. 9 with the understanding that the amplifier 20 contains such a band elimination filter.

It is to be understood that the above-described arrangements are illustrative of the application of the principles of the invention. Numerous other arrangements may be devised by those skilled in the art without departing from the spirit and scope of the invention.

What is claimed is:

1. Apparatus for generating a voltage whose amplitude and polarity is determined by the amount of flutter associated with a periodic pulse train which comprises means to generate a substantially constant amplitude pulse whose duration is determined by the time lapse between consecutive pulses of said train, means to generate a voltage linearly increasing with time from the beginning to the end of said constant amplitude pulse, means to subtract said constant amplitude pulse from said linearly increasing voltage, and means to integrate the difference between said linearly increasing voltage and said constant amplitude pulse.

2. Apparatus for generating a voltage whose amplitude and polarity is determined by the amount of flutter associated with two consecutive pulses of a periodic pulse train which comprises means to generate a substantially constant amplitude pulse whose duration is determined by the time lapse between said pulses, means to generate a voltage linearly increasing with time from the beginning to the end of said constant amplitude pulse, means to subtract said constant amplitude pulse from said linearly increasing voltage, and means to integrate the difference between said linearly increasing voltage and said constant amplitude pulse.

3. Apparatus for generating a voltage whose amplitude and polarity is determined by the accumulated jitter associated with a periodic pulse train which comprises means to generate substantially constant amplitude pulses whose durations are determined by the time lapse between consecutive pulses of said train, means to generate voltages linearly increasing with time from the beginning to the end of each such constant amplitude pulse, means to subtract each such constant amplitude pulse from said linearly increasing voltage generated during the same time, and means to integrate the differences between said linearly increasing voltages and said constant amplitude pulses.

4. Apparatus for generating a voltage whose amplitude and polarity is determined by the accumulated jitter associated with a periodic pulse train composed of odd and even numbered pulses which comprises means to generate substantially constant amplitude pulses whose durations are determined by the time lapse between each odd pulse and its succeeding even pulse, means to generate voltages linearly increasing with time from the beginning to the end of each such constant amplitude pulse, means to subtract each said constant amplitude pulse from said linearly increasing voltage generated during the same time, and means to integrate the differences between said linearly increasing voltages and said constant amplitude pulses.

5. Apparatus for eliminating the flutter associated with a periodic pulse train which comprises means to generate a control voltage whose amplitude and polarity is determined by the accumulated flutter of said pulse train which comprises means to generate substantially constant amplitude pulses whose durations are determined by the time lapse between consecutive pulses of said train, means to generate voltages linearly increasing with time from the beginning to the end of the duration of each said constant amplitude pulse, means to subtract each such constant amplitude pulse from said linearly increasing voltage generated during the same period of time, means to integrate the differences between said linearly increasing voltages and said constant amplitude pulses to generate said control voltage and variable delay means whose delay is a function of an applied voltage, and means for applying said control voltage to said variable delay means to govern the delay of said train of periodic pulses.

6. Apparatus for eliminating the flutter associated with a periodic pulse train of odd and even numbered pulses which comprises means to generate a control voltage whose amplitude and polarity is proportional to the accumulated flutter of said pulse train which comprises means to generate substantially constant amplitude pulses whose durations are determined by the time lapse between each odd numbered pulse and its succeeding even numbered pulse, means to generate voltages linearly increasing with time for the duration of such constant amplitude pulses, means to subtract each said constant amplitude pulse from said linearly increasing voltage generated during the same time, means to integrate the differences between said linearly increasing voltages and said constant amplitude pulses, first variable delay means whose delay is a function of an applied voltage, fixed delay means for delaying each odd numbered pulse of said pulse train, and means for applying said control voltage to said variable delay means to govern the delay of each even numbered pulse of said pulse train.

7. Apparatus for eliminating the flutter associated with a periodic pulse train of odd and even numbered pulses which comprises means to generate a first control voltage whose amplitude and polarity is proportional to the accumulated flutter of said pulse train which comprises means to generate first substantially constant amplitude pulses whose durations are determined by the time lapse between each odd numbered pulse and its succeeding even numbered pulse, means to generate first voltages linearly increasing with time for the duration of said first constant amplitude pulses, means to subtract each said first constant amplitude pulse from said first linearly increasing voltage generated during the same time, means to integrate the differences between said first linearly increasing voltages and said first constant amplitude pulses, variable delay means whose delay is a function of an applied voltage, means for applying said first means for applying said first control voltage to said first variable delay means to govern the delay of each even numbered pulse of said pulse train, means to generate a second control voltage whose amplitude and polarity is proportional to the accumulated flutter of said pulse train which comprises means to generate second substantially constant amplitude pulses whose durations are determined by the time lapse between each even numbered pulse and its succeeding odd numbered pulse, means to generate second voltages linearly increasing with time for the duration of said second constant amplitude pulses, means to subtract each said second constant amplitude pulse from said second linearly increasing voltage generated during the same time, means to integrate the differences between said second linearly increasing voltages and said second constant amplitude pulses, second variable delay means whose delay is a function of an applied voltage, means for applying said second control voltage to said second variable delay means to govern the delay of each odd numbered pulse of said pulse train.

No references cited.